Oct. 31, 1950     A. A. GREENBERG     2,527,991
CONTAINER
Filed Nov. 21, 1947
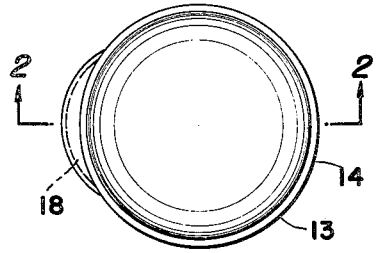
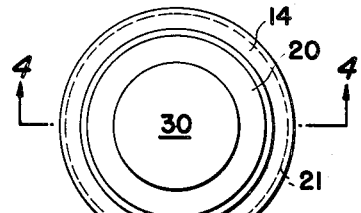
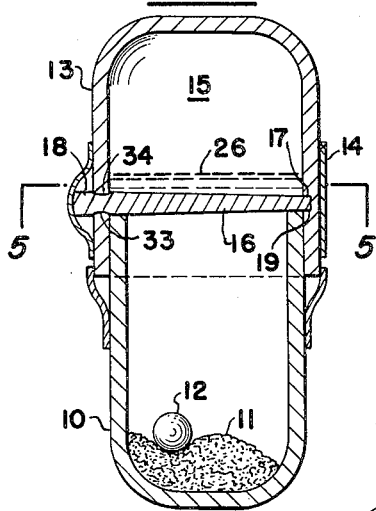
INVENTOR.
ALVIN A. GREENBERG
BY Howard J. Whelan
ATTORNEY Patented Oct. 31, 1950

2,527,991

UNITED STATES PATENT OFFICE 2,527,991

CONTAINER

Alvin A. Greenberg, Baltimore, Md.

Application November 21, 1947, Serial No. 787,273

3 Claims. (Cl. 206—47)

1

This invention relates to dental equipment and more particularly to the manipulation of ingredients to make fillings for teeth, and for prescription uses.

The usual manner of making fillings, particularly of the amalgam type, for teeth and dental structures, consists in pouring a quantity of mercury on a mortar plate, followed by an admixture of silver, gold or other suitable ingredients thereto to complete the compound to be made. The objection of this method is that it is done openly where dust of the air, bacteria, moisture and grit on the plate can reach the mixture freely during the mixing and compounding. Further the quantities are administered according to the skill or judgment of the operator and vary from time to time, instead of being uniform. This variation in quantities affects the strength of the final compound and otherwise interferes with its resultant value for use in the filling of teeth or whatever purpose it is required for. Further this method of mixing is slow and subject to spilling effects.

It is therefore an object of this invention to provide a new and improved device for controlling the quantities of ingredients for making dental fillings and the manner of mixing them that will avoid one or more of the disadvantages and limitations of the prior art.

Another object of the invention is to provide a new and improved device for mixing ingredients for dental filling that will provide for the accurate apportionment of the ingredients and their mixture in a sanitary manner when being manipulated for making the predetermined compound.

An additional object of the herein described invention is to provide a new and improved device for compounding the ingredients for a dental filling in an expeditious and effective manner.

An additional object of the present invention is to provide a new and improved capsule having a plurality of compartments for separating ingredients placed therein from each other until it is desired to mix them then proceeding with said mixing operation within one of said compartments.

Other objects will become apparent as the invention is more fully set forth.

In order to clarify and explain the principles of the invention reference is made to the accompanying drawings, in which a particular form of the invention is indicated by way of example, and which together with the description following, outline a construction involving its principal features for practical operation in daily use; while the claims particularly point out the scope of the invention.

Referring to the drawings:

Figure 1 is a plan view of a capsule embodying this invention;

Figure 2 is a sectional elevation through the capsule shown on line 2—2 of Figure 1;

Figure 3 is a plan view of a modified form of capsule embodying this invention;

Figure 4 is a sectional elevation through the capsule shown on line 4—4 of Figure 3;

Figure 5 is a plan view of the partition showing the indentation;

Figure 6 is a modified form of capsule embodying this invention, and

Figure 7 is a modified form of a capsule embodying this invention.

Similar reference characters refer to the same parts throughout the drawings.

In the structure indicated in the drawings, a capsule consists of a relatively long lower casing 10 in which ingredients 11 in powdery form for making a filling cement for teeth are loosely deposited, and take up a small portion of the space therein. These ingredients are those of any standard materials usable for the purpose, such as powdered copper 6% maximum, tin 25% minimum, silver 65% minimum, zinc 2% maximum, loosely intermixed are kept hermetically sealed within the casing. The proportions given are considered in quantities by weight in conventional practice. The powdered mixture is referred to as "alloy" in the dental profession. The mercury added is in the proportion of 7 parts mercury to 5 parts alloy. The usual filling consists of about 15 grains of alloy to 21 grains of mercury. In addition balls 12 are also loosely included in this lower casing and can freely move about in the alloy ingredients 11 and speedily assist in the mixing of the mercury and alloy into a putty like form and to prevent the alloy from sticking to the sides of the casing.

A cap 13 is attachable to the open end of the casing 10 so as to close it. This cap 13 and partition 16 are cemented in place on the casing 10 or held tight thereon by wax or by a removable ribbon or film 14 of some suitable plastic to keep the contents air tightly positioned inside. The cap 13 and casing 10 are preferably made of a transparent plastic material. The cap 13 is made with a compartment 15 in its upper end portion by a suitable partition 16 insertable through a slot 17 in the wall of the cap 13 and fitting into a groove 19 in the partition to hold it in place. This compartment 15 serves to hold mercury 26 in its liquid state, therein, and is of sufficient quantity to mix most effectively with the ingredients 11 to make the desired filling compound for teeth. The partition 16 is accessibly reached by having an extending edge portion 18 projecting out to the outside of the cap 13, through the slot 17. When pulled hard the partition 16 will separate from the groove 19 and open up the chamber in the cap so the mercury 26 can flow from the cap 13 into the lower casing 10 and mix with the ingredients 11. To facilitate the mixing and chemical compounding the capsule is shaken hard so the balls 12 will roll in the ingredients, including the mercury, and mix and pound or knead them together thoroughly. The shaking may be done by hand or by a suitable shaking machine, already available, in the commercial field. After the compound is mixed thoroughly and chemically and physically combined into a lump ready for use, it is removed from the capsule by tearing off or removing the cap 13 and dumping the lump on a suitable surface. The dentist then picks up the compounded lump and uses it at his convenience in the conventional manner. The balls 12 are discarded readily as the compound is free of them and can be separated from it without difficulty.

In the modified form shown in Figures 3 and 4 the cap 20 is formed so as to fit in its lower casing 21 against a partition 22 in which a hole 23 non-centrally arranged, is provided. The cap also has a partition 24 with a hole 25 therein registerable with the hole 23 when the partition 24 is axially rotated against the partition 22 to the proper position. The cap 20 has a suitable quantity of mercury 26 therein for mixing with the ingredients 11 in the lower casing 21 when the holes 23 and 24 are aligned and allow the mercury to pass through. The balls 12 are also preferably positioned with the ingredients in the lower casing 21 to assist in kneading the composition aforesaid. The mixing process is proceeded with by shaking as aforesaid. The cap 20 may be held in place with the lower casing 21 by a removable plastic ribbon or film 14 as in the other form described and indicated in Figure 2, or they may be held together by projections 27 formed on the casing 21 which snap into groove 28 formed in the cap 20. This arrangement will allow the cap and casing to be rotated to align or disalign the holes 23 and 25 to allow the mercury to pass through when the holes are aligned or to close them during shipment or during the mixing stage. The film 14 is preferably of a self-shrinking type that will conform to any contour of the item on which it is placed. The upper end of the cap 20 is provided with grooves 29 which tend to hold a stopper 30 for closing the end of the cap. The end of the casing 21 is provided with a groove 31 to hold the stopper 32 to close the end thereof. Although stoppers 30 and 32 are shown for closing the ends of the cap and casing it is understood that screw caps may be used or the ends of the tubes may be closed in any conventional manner without altering the invention. The container is filled in the most effective manner and under the most sanitary conditions. The mercury 26 is apportioned accurately before placement in the cap, as also are the ingredients 11 before placement in the casing. Two general ideas for filling the containers are as follows: In the container shown in Figure 2, the cap 13 is inverted and a measured amount of mercury is placed therein, the partition 16 is inserted until the rear edge is positioned in the groove 19 and the irregular shaped indentation 33 allows the front edge 34 of the cap 13 to snap therein to hold the partition 16 in place and the mercury 26 in the compartment 15. The ingredients 11 and the balls 12 are then placed in the casing 10 and cap 13 is then placed thereon and if desired the joints may be sealed by any of the conventional methods. To use the container, the extended edge portion 18 of the partition 16 is grasped and the partition pulled out of the slot 17 and allows the mercury 26 to drop into the casing 10 and be mixed with the ingredients 11 through the action of the ball 12 and the shaking of the container. The cap 13 is pressed down on the casing 10 to close the slot. When the composition is properly kneaded the cap and casing are separated and the composition removed and used by the dentist.

In the use of the container shown in Figure 4 the cap 20 and the casing 21 are assembled and held together by the projections 27 which are positioned in the groove and the holes 23 and 25 are misaligned. The mercury 26 is positioned in the cap and the end closed by a cork or cap. The case is inverted and the ingredients 11 and balls 12 are positioned in the casing and its end closed as aforesaid. To use the container for mixing the cap or casing is turned until the holes 23 and 25 are aligned and the mercury allowed to flow through to the casing, the cap or casing is then turned until the holes 23 and 25 are out of alignment, and the container is then shaken to knead the composition which is then removed by extracting the cork 32. The container or capsule keeps the contents clean and free from dust and foreign matter at all times from the time it is packed, through the kneading stage and until it is removed from the capsule.

In the modified form indicated in Figure 6, the capsule has a casing 40 of cylindrical form and closed-in curved end 41. It is open at the other end and provided with a stepped groove 42. After ingredients 43 of the proper nature are placed in the casing, a circular disc 44 is inserted in the groove 42 and cemented in place to close this end also. This disc 44 has an opening 45 through it at a suitable location therein away from the center and also an embossed lump 46 at another point located on the same circle that the opening 45 is on. A cap 47 closed-in and curved at one end as indicated at 48 is of cylindrical form and sufficiently large to slip over the casing and fit tightly thereon. Adjacent its middle is a disc 49 similar to 44 fitting in a groove 50 and cemented therein to hold ingredients 51 in the cap. This disc has an opening 52 and a lump 53 alignable with those on the disc 44. When the cap 47 is rotated around its axis to the proper point, the lump 53 will project into the opening 45 and the lump 46 in the opening 52 so the casing and cap with their discs will be aligned and locked in position. The film 55 positioned about the joint 54 will retain them in that position. When the film is removed, the cap may be turned to a position where the openings 45 and 52 are aligned and permit the free movement of the ingredients in the cap to flow into the casing 40 and mix with ingredients 43 therein. Balls or other items of suitable form and material may be used to promote the mixture of the ingredients as in the previous forms described. In this instance the ingredients are in powdered form and dry, or the casing may have powder and the cap a liquid, such as might be employed for a physician's prescription.

The cap and casing are opened from each other to remove the mixed contents for use, or the end may be cut-off or broken to remove the mixed contents.

In Figure 7, the structure consists of the cylindrical tubes 60 and 61 one fitting over the other, at one end and the opposite ends closed by caps 62 and 63. These caps are removable and allow the ingredients to be inserted in the respective tubes. A partition 64 is used across the top of tube 61 to retain its ingredients therein and separated from those in the tube 60. This partition is made relatively thick so a tapered or straight plug or gate 65 may be installed and opened therein to close or open a passageway 66 through the partition. The partition is attached to the end of the tube 61 in any suitable manner. The gate 65 extends outside the wall of the tube 61 where it can be operated by the user. The tubes have their respective ingredients 67 and 68 which may be mixed by operating the gate 65 suitably.

While a preferred use of the device described is for dental work, such use can be extended to include the mixture of ingredients for prescriptions and similar purposes, where such mixing is desirable just before actual use of the compound or mixture resulting. This fact is to be understood in defining the scope of the wording used. The term capsule is intended to be interpreted as broad enough to include a container, vessel, or other object for holding material.

While several general forms of the invention are shown in the drawings and described in the specifications it is not desired to limit this application for patent to these particular forms or in any other way otherwise than limited by the scope thereof, as it is appreciated that other forms could be made that would use the same principles and come within the scope of the appended claims.

Having thus described the invention, what is claimed is:

1. A container consisting of two opposed and aligned telescopic tubular plastic sections closed at opposite ends, one of the sections having a slot defined by spaced edges through a portion of the side wall thereof and an inwardly facing groove in another portion of the side wall opposite said slot, a partition separating said sections and providing opposed chambers containing separate ingredients, said partition extending through said slot and having an arcuate groove receiving an edge of said slot and normally locking said partition in said section, said partition also having one end received in said inwardly facing groove, said partition having an extension beyond the confines of both sections whereby it is handled to selectively place it and withdraw it.

2. In a container as set forth in claim 1, combined locking and sealing means extending about said container and encompassing the extension on said partition.

3. In a container as set forth in claim 1, frangible locking and sealing means extending about said container and encompassing the extension on said partition, and means in one of said chambers to assist mixing of the ingredients upon fracture of the sealing means and withdrawal of said partition.

ALVIN A. GREENBERG.

REFERENCES CITED

The following references are of record in the file of this patent:

UNITED STATES PATENTS

| Number | Name | Date |
|---|---|---|
| 1,226,634 | Briese | May 22, 1917 |
| 1,464,273 | Schopflocher | Aug. 7, 1923 |
| 1,508,958 | Cox | Sept. 16, 1924 |
| 1,774,258 | English | Aug. 26, 1930 |
| 1,918,109 | Joyce | July 11, 1933 |
| 1,983,278 | Flanigan | Dec. 4, 1934 |
| 2,382,978 | Curry | Aug. 21, 1945 |